(12) United States Patent
Matsumoto

(10) Patent No.: US 6,504,627 B1
(45) Date of Patent: Jan. 7, 2003

(54) IMAGE PROCESSING DEVICE

(75) Inventor: Manabu Matsumoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/184,911

(22) Filed: Nov. 3, 1998

(30) Foreign Application Priority Data

Nov. 20, 1997 (JP) .............................................. 9-319614

(51) Int. Cl.7 ................................................. H04N 1/04
(52) U.S. Cl. .................................................... 358/448
(58) Field of Search ................................. 358/448, 444, 358/498, 468, 401, 496, 408, 441, 404, 296

(56) References Cited

U.S. PATENT DOCUMENTS 5,412,485 A * 5/1995 Kashinagi ................... 358/441
6,035,156 A * 3/2000 Okamoto ..................... 399/82
6,088,135 A * 7/2000 Kusumoto ................... 358/498

FOREIGN PATENT DOCUMENTS

JP 02066586 A 6/1990

* cited by examiner

Primary Examiner—Cheukfan Lee
(74) Attorney, Agent, or Firm—Edwards & Angell, LLP; David C. Conlin; Richard J. Roos

(57) ABSTRACT

An image processing device includes: (1) an input device for inputting image data; (2) a setting device for setting a processing mode of inputted image data; (3) an image processing section for performing predetermined image processing in accordance with the processing mode set by the setting device; (4) an output device for outputting the image data that has undergone the image processing; (5) a management device for managing output conditions of each image data to be outputted by the output device; and (6) a control device for controlling each image to be outputted by the output device in accordance with the output conditions of the image data managed by the management device. It is thus possible to certainly output the inputted image data, and quickly and appropriately recover from various troubles. Thus, this image processing device can improve the reliability in outputting the image, while minimizing the increase in the cost of the device.

20 Claims, 11 Drawing Sheets

F I G. 5

[ REGISTER JOB MANAGEMENT TABLE ] ~730

| REGISTER ID | MODE | JOB STATUS | RESTARTING INSTRUCTION | PRIORITY |
|---|---|---|---|---|
| 1 | COPY | SUSPENDED | REQUESTED | 2 |
| 2 | FAX 1 | WAITING | NOT REQUESTED | 4 |
| 3 | PRINTER 1 | WAITING | NOT REQUESTED | 3 |
| 4 | INTERRUPT COPY | IN PROGRESS | REQUESTED | 1 |
| 5 | FAX 2 | WAITING | NOT REQUESTED | 5 |
| | | | | |
| | | | | |
| | | | | |
| 731 | 732 | 733 | 734 | 735 |

FIG. 6

[ PRINT MANAGEMENT TABLE ] ~740

| PRINT ID | SHEET SIZE | TRAY LOCATION | ATTRIBUTE DATA ||||||| 
| | | | FRONT/ BACK | PRINT/ NO PRINT | PRINT MODE | FINAL IMAGE | NEXT SIDE CHANGE | JOB SUSPENSION | POINTER |
|---|---|---|---|---|---|---|---|---|---|
| 1 | A4 | 2 | FRONT | PRINT | PRINT | — | — | — | |
| 2 | A4 | 2 | FRONT | PRINT | PRINT | — | — | — | |
| 3 | A3 | 4 | FRONT | PRINT | PRINT | — | — | 1 | ⇩−1 |
| 4 | A4 | 2 | FRONT | PRINT | PRINT | 1 | — | — | |
| 5 | A4 | 2 | | | | | | | |

741 742 743 744 745 746 747 748 749 750

[SHEET MANAGEMENT TABLE] ~760

| SHEET ID | SHEET SIZE | TRAY LOCATION | JOB | PRINT ID | SHEET LOCATION | SHEET INTERVAL TIME | SHEET PROCESSING COMMAND |
|---|---|---|---|---|---|---|---|
| 1 | A4 | 2 | 1 | 1 | f:DISCHARGING | 17*50msec | FINISHER |
| 2 | A4 | 2 | 1 | 2 | c:SEPARATION | 17*50msec | FINISHER |
| 3 | A3 | 4 | 1 | 3 | b:RESIST-ROLLER | 17*50msec | FINISHER |
| 4 | A4 | 2 | 1 | 4 | a:FEEDING | 17*50msec | FINISHER STAPLING |
| 761 | 762 | 763 | 764 | 765 | 766 | 767 | 768 |

FIG. 9 (b)

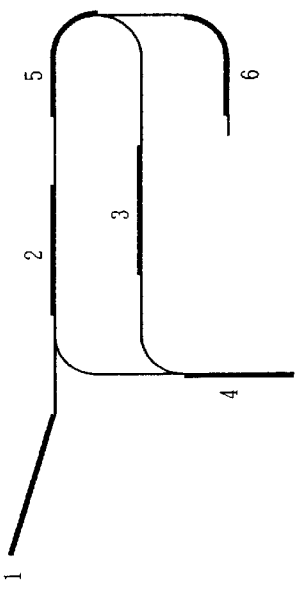

FIG. 9 (d)

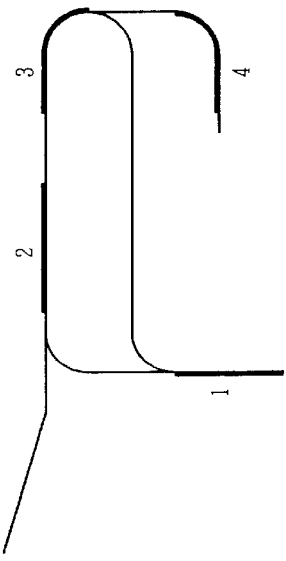

FIG. 9 (a)  760a

| SHEET ID | SHEET SIZE | TRAY LOCATION | JOB | PRINT ID | SHEET LOCATION | SHEET INTERVAL TIME | SHEET PROCESSING COMMAND |
|---|---|---|---|---|---|---|---|
| 1 | A4 | 2 | 1-2 | 12 | d:INVERSION | 17*50msec | DUPLEX |
| 2 | A4 | 2 | 1-2 | 10 | c:SEPARATION | 17*50msec | DUPLEX |
| 3 | A4 | 2 | 1-2 | 8 | b:RESIST-ROLLER | 17*50msec | DUPLEX |
| 4 | A4 | 2 | 1-2 | 6 | a:FEEDING | 17*50msec | DUPLEX |
|   |   |   |   |   |   |   |   |

| SHEET ID | SHEET SIZE | TRAY LOCATION | JOB | PRINT ID | SHEET LOCATION | SHEET INTERVAL TIME | SHEET PROCESSING COMMAND |
|---|---|---|---|---|---|---|---|
| 1 | A4 | 2 | 1-1 | 11 | f:DISCHARGING | 17*50msec | FINISHER |
| 2 | A4 | 2 | 1-1 | 9 | c:SEPARATION | 17*50msec | FINISHER |
| 3 | A4 | 0 | 1-1 | 7 | e:LOOP | 17*50msec | FINISHER |
| 4 | A4 | 0 | 1-1 | 5 | d:INVERSION | 17*50msec | DUPLEX |
| 5 | A4 | 2 | 1-2 | 4 | b:RESIST-ROLLER | 17*50msec | DUPLEX |
| 6 | A4 | 2 | 1-2 | 2 | a:FEEDING | 17*50msec | FINISHER STAPLING |

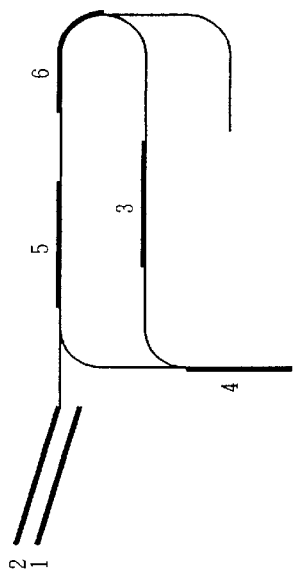

FIG. 10 (d)

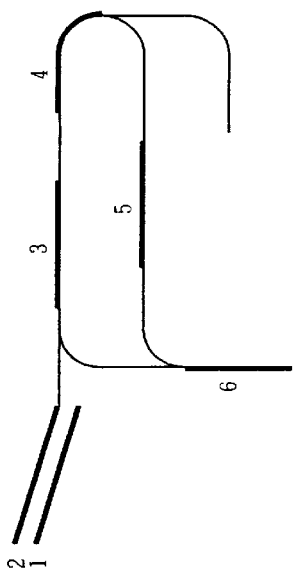

FIG. 10 (a) 760c

| SHEET ID | SHEET SIZE | TRAY LOCATION | JOB | PRINT ID | SHEET LOCATION | SHEET INTERVAL TIME | SHEET PROCESSING COMMAND |
|---|---|---|---|---|---|---|---|
| 3 | A4 | 0 | 1-1 | 7 | e:LOOP | 17*50msec | FINISHER |
| 4 | A4 | 0 | 1-1 | 5 | d:INVERSION | 17*50msec | DUPLEX |
| 5 | A4 | 2 | 1-2 | 4 | c:SEPARATION | 17*50msec | DUPLEX |
| 6 | A4 | 2 | 1-2 | 2 | b:RESIST-ROLLER | 17*50msec | FINISHER STAPLING |
|  |  |  |  |  |  |  |  |

| SHEET ID | SHEET SIZE | TRAY LOCATION | JOB | PRINT ID | SHEET LOCATION | SHEET INTERVAL TIME | SHEET PROCESSING COMMAND |
|---|---|---|---|---|---|---|---|
| 3 | A4 | 0 | 1-1 | 7 | c:SEPARATION | 17*50msec | FINISHER |
| 4 | A4 | 0 | 1-1 | 5 | b:RESIST-ROLLER | 17*50msec | FINISHER |
| 5 | A4 | 0 | 1-1 | 3 | e:LOOP | 17*50msec | FINISHER |
| 6 | A4 | 0 | 1-1 | 1 | d:INVERSION | 17*50msec | FINISHER STAPLING |
|  |  |  |  |  |  |  |  |

761d 762d 763d 764d 765d 766d 767d 768d

FIG. 11 (a) 760e
| SHEET ID | SHEET SIZE | TRAY LOCATION | JOB | PRINT ID | SHEET LOCATION | SHEET INTERVAL TIME | SHEET PROCESSING COMMAND |
|---|---|---|---|---|---|---|---|
| 5 | A4 | 0 | 1-1 | 3 | c:SEPARATION | 17*50msec | FINISHER |
| 6 | A4 | 0 | 1-1 | 1 | b:RESIST-ROLLER | 17*50msec | FINISHER STAPLING |
| | | | | | | | |
| | | | | | | | |
| | | | | | | | |
| | | | | | | | |
761e 762e 763e 764e 765e 766e 767e 768e
FIG. 11 (b)
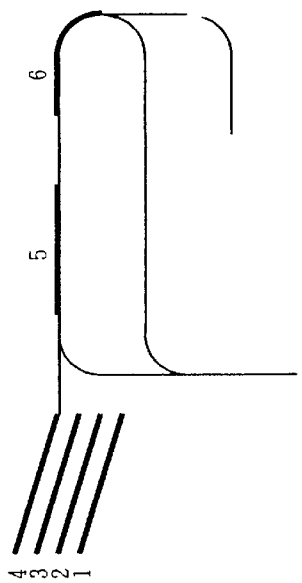
FIG. 11 (c) 760f
| SHEET ID | SHEET SIZE | TRAY LOCATION | JOB | PRINT ID | SHEET LOCATION | SHEET INTERVAL TIME | SHEET PROCESSING COMMAND |
|---|---|---|---|---|---|---|---|
| 6 | A4 | 0 | 1-1 | 1 | f:DISCHARGING | 17*50msec | FINISHER STAPLING |
| | | | | | | | |
| | | | | | | | |
| | | | | | | | |
| | | | | | | | |
| | | | | | | | |
761f 762f 763f 764f 765f 766f 767f 768f
FIG. 11 (d)
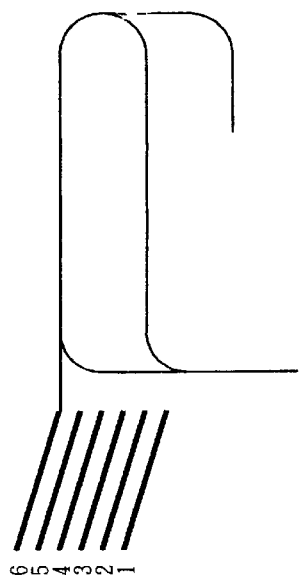

IMAGE PROCESSING DEVICE

FIELD OF THE INVENTION

The present invention relates to an image processing device for performing image processing with respect to image data inputted through a document image reading device such as a scanner, converting the image data so as to have a desired image expression, and outputting the resulting image data. The present invention more specifically relates to such an image processing device for managing output conditions of each inputted image data, and reproducing the inputted image as an output material in a predetermined form.

BACKGROUND OF THE INVENTION

There has conventionally been an image processing device capable of performing predetermined processing selected from various image processing functions thereof with respect to a document image inputted from a document image reading section, and outputting the processed image from a printer section. The image processing device has been strongly desired to process a large volume of documents efficiently in a short time. In order to meet such a strong desire, for example, a digital copying machine for automatically processing and outputting a large volume of documents has been developed.

In addition, there is a multi-functioned digital copying machine capable of not only outputting from a printer section a document image inputted from a document reading section, but also outputting an image signal inputted from an external apparatus by using a facsimile function and a printer function.

Such image processing devices are required to be built to meet basic specifications to achieve high-speed-operation, high-quality-image-production, multifunction, low-cost, low-energy-consumption, etc. Furthermore, it is strongly desired that the image processing devices should rapidly and accurately perform the whole processing, from reading of a document image to outputting of the inputted image, even when recovering from troubles such as a jam.

In some digital copying machines, a recirculating automatic document feeder is provided so as to improve the operation efficiency. In this case, if a jam occurs when reading a document in the recirculating automatic document feeder, smooth recovery from the jam after the jam has been cleared is essential for achieving an efficient operation.

If recovery from a trouble is not smoothly carried out, the operation efficiency and reliability of the device are remarkably decreased. Thus, various devices for achieving smooth recovery from a trouble have been disclosed.

For example, Japanese Publication of Unexamined Patent Application No. 66586/1990 (Tokukaihei 2-66586) discloses an image processing device that smoothly recovers from a jam in the following manner. Specifically, when the image processing device detects that a document is set on a platen with a different side facing up when starting copying, the document is automatically turned over. This arrangement saves the operator from inconvenience to reset the documents one by one.

More specifically, according to the above-mentioned publication (Tokukaihei 2-66586), the image processing device is provided with a document side detecting section, a document recovery processing section, and a judging section for judging whether a discharge document has been copied or not. The document side detecting section detects which side (surface) of the document on the platen faces up. The document recovery processing section compares the detected document side with a document side to be copied next, and turns upside down the document if a different side faces up.

With this structure, if the image processing device detects that a document is placed on the platen with a different side facing up when starting copying, the document is automatically turned over. In addition, when the image processing device is caused to stop, it works out from which page the processing should be restarted, by judging from the number of copy sheets and the documents to which the processing is successfully performed, and determines whether a document purge is necessary or not. This arrangement saves the operator from inconvenience to reset the documents one by one, and improves the operation efficiency in recovering from a jam.

Meanwhile, some image processing devices such as a multi-functioned digital copying machine are arranged so as to process each image data in the corresponding mode, for example, when receiving an image from an external apparatus, such as a facsimile machine and a personal computer, while copying another image. In such devices, it is necessary to manage image data in each mode and to certainly and efficiently output the inputted image data as an image in the mode.

The above publication (Tokukaihei 2-66586) only mentions improvement of the operation efficiency of the image processing device achieved by comparing the number of copy sheets with the number of documents when recovering from a jam. However, it does not mention a method for managing output images which allows the image processing device to cope with troubles when it receives image data from, for example, a facsimile machine or a personal computer. Thus, the above image processing device still takes time to recover from such troubles and restart outputting images.

Specifically, when a trouble such as a jam occurs in an image output section while successively outputting, as images, image data inputted in a plurality of modes, if accurate jam recovery is not carried out in the process of outputting the images, it may be uncertain how far the image processing has been proceeded, and re-outputting the image data which has been already outputted may be required. Therefore, the conventional management method does not satisfactorily improve the operation efficiency of the image processing device.

Furthermore, a control section for executing the management method becomes more complicated than a control section that does not execute such management. Thus, the image processing device requires a processor with higher-performance, an accompanying peripheral circuit, etc. so as to prevent the operation efficiency from decreasing, thereby raising the cost of the device as a finished product.

SUMMARY OF THE INVENTION

In view of the above problems, it is an object of the present invention to provide a highly-reliable image processing device that is provided with an image process management table for managing contents of processing with respect to the image data of each image to be formed in an image forming section, and capable of successively forming the images according to the contents of the processing managed by the image process management table, certainly outputting the inputted image data, and quickly and appropriately recovering from various troubles, while minimizing the increase in the cost of the device.

An image processing device of the present invention includes: (1) input means for inputting image data; (2) setting means for setting a processing mode of inputted image data; (3) image processing means for performing predetermined image processing according to a processing mode set by the setting means; (4) output means for outputting the image data that has undergone the image processing; (5) management means for managing output conditions of each image data to be outputted by the output means; and (6) control means for controlling each image data to be outputted as an image by the output means according to the output conditions of the image data managed by the management means.

Since the image processing device is provided with the image processing means and the setting means, it is possible to standardize the control information of the image data, inputted in accordance with each processing mode, so as to meet the specifications of the output process, such as the print process, performed by the output means. Consequently, the above arrangement can simplify the output process of the image data in the respective processing modes.

The image processing device is further provided with the management means for managing output conditions of each image data, and the processed image is outputted through the output means in accordance with the output conditions managed by the management means. It is thus possible to certainly manage the output process of each inputted image data. Furthermore, since the output conditions are managed by the management means, recovery from a trouble is easily carried out, thereby improving reliability in the output process.

For a fuller understanding of the nature and advantages of the invention, reference should be made to the ensuing detailed description taken in conjunction with the accompanying drawings.

BRIEF DESCRIPTION OF THE DRAWINGS

FIG. 5 is an explanatory view showing a register job management table for managing, as a job, each group of image data in the copying machine.

FIG. 6 is an explanatory view showing a print management table of the copying machine, which is produced when image data is outputted.

FIG. 9(A) is an explanatory view showing a sheet management table managing four pieces of sheets in accordance with the duplex image recording mode in the copying machine.

FIG. 9(B) is an explanatory view showing transport states of the sheets, managed by the sheet management table of FIG. 9(A), in the duplex transport loop.

FIG. 9(C) is an explanatory view showing the sheet management table when six pieces of sheets are managed.

FIG. 9(D) is an explanatory view showing transport states of the sheets, managed by the sheet management table of FIG. 9(C), in the duplex transport loop.

FIG. 10(A) is an explanatory view showing the sheet management table after two sheets have been processed in accordance with the duplex image recording mode in the copying machine.

FIG. 10(B) is an explanatory view showing transport states of the sheets, managed by the sheet management table of FIG. 10(A), in the duplex transport loop.

FIG. 10(C) is an explanatory view showing the sheet management table indicating how the remaining four sheets are further processed.

FIG. 10(D) is an explanatory view showing transport states of the sheets, managed by the sheet management table of FIG. 10(C), in the duplex transport loop.

FIG. 11(A) is an explanatory view showing the sheet management table, after four sheets have been processed, which manages the remaining two sheets in accordance with the duplex image recording mode in the copying machine.

FIG. 11(B) is an explanatory view showing transport states of the sheets, managed by the sheet management table of FIG. 11(A), in the duplex transport loop.

FIG. 11(C) is an explanatory view showing the sheet management table after the six sheets have been processed.

FIG. 11(D) is an explanatory view showing transport states of the sheets, managed by the sheet management table of FIG. 11(C), in the duplex transport loop.

DESCRIPTION OF THE EMBODIMENTS

Figure 1:
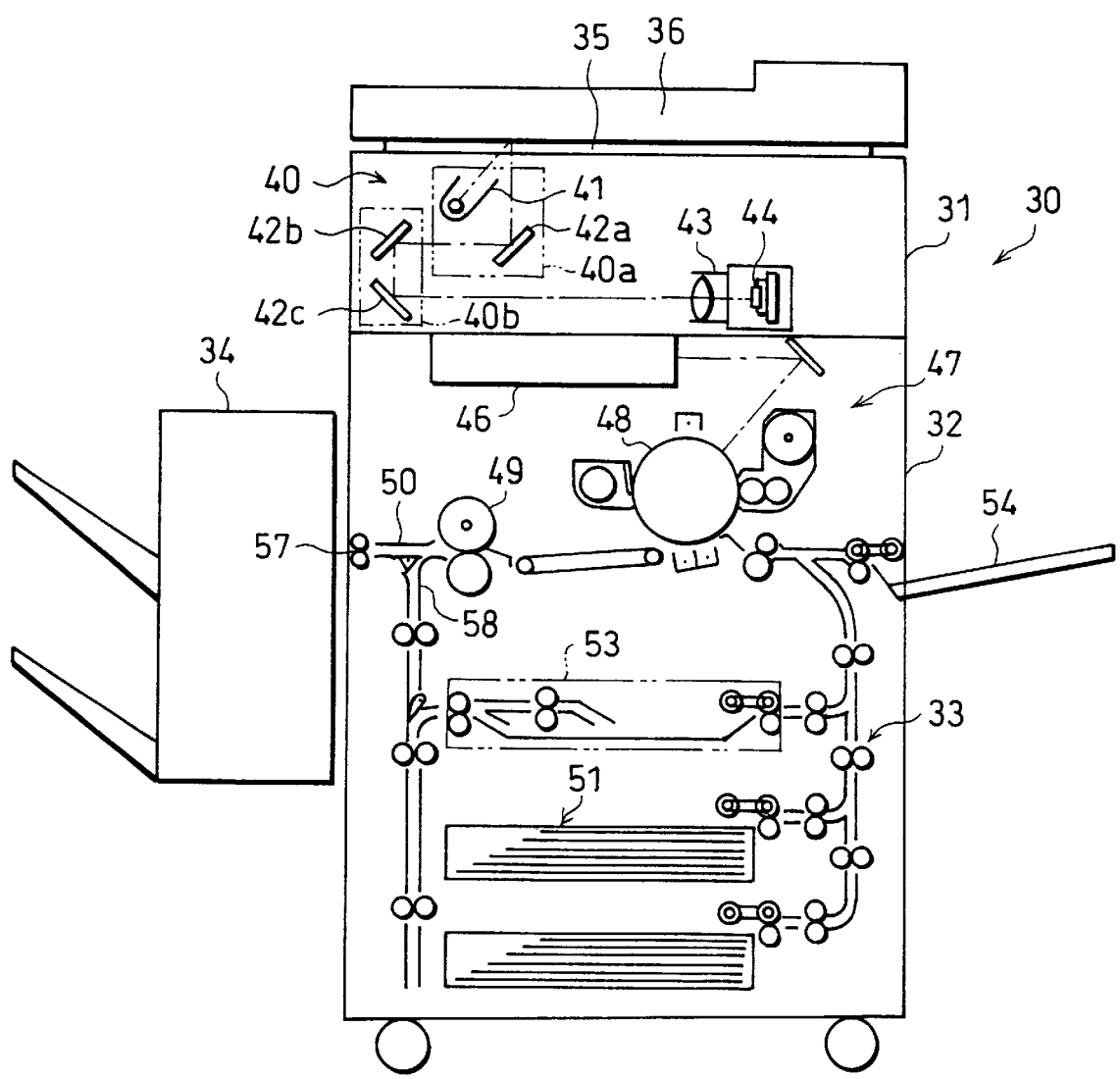
FIG. 1 is a sectional view showing an entire structure of a digital copying machine as one embodiment of an image processing device of the present invention.

Referring to the drawings, the following descriptions will explain one embodiment of an image processing device of the present invention. Here, the image processing device of the present invention is a digital copying machine.

Although the explanation of this embodiment is given only for the case where the present invention is applied to a digital copying machine, application of the present invention is not limited to a digital copying machine. Specifically, the present invention can be applied to an image processing device for performing image processing with respect to image data inputted from a document image reading apparatus, etc., converting the image data so as to have a desired image expression, and outputting the resulting image data. Namely, it is needless to say that the present invention can be applied to any image processing device that includes a management table for managing contents of image processing for each image formed in an image forming section, and sequentially forms images according to the contents of the processing managed in the management table.

First, the digital copying machine described in the present embodiment has, for example, a copy mode, a printer mode, a fax mode, etc. FIG. 1 is a sectional view showing the entire structure of the digital copying machine. With reference to FIG. 1, the entire structure of the digital copying machine will be explained.

A digital copying machine 30 is mainly composed of a scanner section 31 as input means, and a laser recording section 32 as an image forming section (output means).

The scanner section 31 includes a document platen 35 made of transparent glass, an automatic document feeder (ADF) 36 for automatically feeding a document onto the document platen 35, and a document image reading unit, i.e., a scanner unit 40 for reading an image on the document placed on the document platen 35 by scanning.

The document image read in the scanner section 31 is sent as image data to a main-image processing board and a sub-image processing board, to be described later, and undergoes predetermined image processing.

The ADF 36 is a device in which a plurality of documents are set on a provided document tray (not shown) at a time, and the set documents are automatically fed sheet by sheet to the document platen 35 of the scanner unit 40.

The ADF 36 includes, though not shown, a transport path for single-sided documents, a transport path for double-sided documents, transport-path switching means, a sensor group for recognizing and controlling a state of the document being passed through each section, a control section, etc., so that one side or both sides of documents is/are read by the scanner unit 40 according to a selection made by an operator. As to the ADF 36, many applications have been filed, and there are a variety of ADFs available on the market, and thus further explanations thereof are omitted here.

The scanner unit 40 for reading an image on the document placed on the document platen 35 constitutes the scanner section 31, and includes a lamp reflector assembly 41 for the exposure of the surface of the document, a first reflecting mirror unit 40a, a second scanning unit 40b, an optical lens 43, and a photoelectric transfer element (CCD) 44. The first reflecting mirror unit 40a has a first reflecting mirror 42a for reflecting light reflected from the document, for guiding the reflected light image from the document to the CCD 44. The second scanning unit 40b has a second reflecting mirror 42b and a third reflecting mirror 42c for guiding the reflected light image from the first scanning mirror unit 40a to the CCD 44. The optical lens 43 forms the reflected light image from the document on the CCD 44 through the respective reflecting mirrors.

The scanner section 31 successively places documents to be read on the document platen 35 by operations associated with the ADF 36 and the scanner unit 40, and moves the scanner unit 40 along the bottom surface of the document platen 35 so as to read the document image.

In particular, the first scanning mirror unit 40a scans at a constant velocity V from the left to the right along the document platen 35, and the second scanning unit 40b is controlled so as to scan in the same and parallel direction at a velocity of V/2. Thus, the document image is read by sequentially forming an image of the document placed on the document platen 35 line by line on the CCD 44.

The image data resulting from reading the document image by the scanner unit 40 are sent to the main-image processing board and the sub-image processing board, to be described later, and temporarily stored in a memory of the main-image processing board and a memory of the sub-image processing board after various image processes. Then, the image data in the memory is read out according to an output instruction, and transferred to the laser recording section 32 to form an image on a sheet as a recording medium.

The laser recording section 32 includes a transport system for transporting the sheet on which an image is to be formed, a laser writing unit 46, and an electrophotographic processing section 47 for forming an image. The laser writing unit 46 is shown as an LSU 46 in FIG. 2.

The laser writing unit 46 includes a semiconductor laser source (not shown) for emitting laser light according to the image data read out from the memory after being read by the scanner unit 40 or the image data transferred from an external device, a polygon mirror (not shown) for deflecting the laser light at a constant angular velocity, and an f·θ lens (not shown) for correcting the laser light deflected at a constant angular velocity by the polygon mirror so that it is deflected at a constant angular velocity on a photoreceptor drum 48 constituting the electrophotographic processing section 47.

The electrophotographic processing section 47 further includes a charger, a developing device, a transfer device, a separating device, a cleaning device, and a charge removing device which are placed along the outer surface of the photoreceptor drum 48 in a known manner.

On the other hand, the transport system includes a transportation section 33 for transporting the sheet to the electrophotographic processing section 47 for forming an image, particularly to a transfer position where the transfer device is placed; a multi-stage feed section, having a plurality of feed trays 51 as cassette feeders, for feeding the sheet to the transportation section 33; a manual feeder 54 for feeding a sheet of a desired size as the occasion arises; a fusing device 49 for causing a transferred image, particularly a toner image, to be affixed onto the sheet; and a retransport path and a duplex (double-side recording) unit 53 for feeding again the sheet having the image affixed thereon so as to form an image on the back surface of the sheet.

Disposed on the downstream side of the fusing device 49 is a post-processing device 34 for receiving the sheet having an image recorded thereon and for applying predetermined processing to the sheet with a finisher and a sorter provided therein.

In the laser writing unit 46 and the electrophotographic processing section 47, according to the image data read out from an image memory, an electrostatic latent image is formed on the surface of the photoreceptor drum 48 by scanning the photoreceptor drum 48 with a laser beam emitted from the laser writing unit 46. The electrostatic latent image is visualized by toner on the surface of the photoreceptor drum 48, and the resulting toner image is electrostatically transferred and fixed onto the sheet being fed from one of the feed trays 51 in the multi-stage feed section. The sheet having an image formed thereon in this manner is fed into the post-processing device 34 from the fusing device 49 through sheet discharge rollers 57.

(Circuit of the Image Processing Section)

Next, the following description will explain the structure and the functions of the image processing section (image processing means), provided in this digital copying machine 30, for performing image processing with respect to read document image data.

Figure 2:
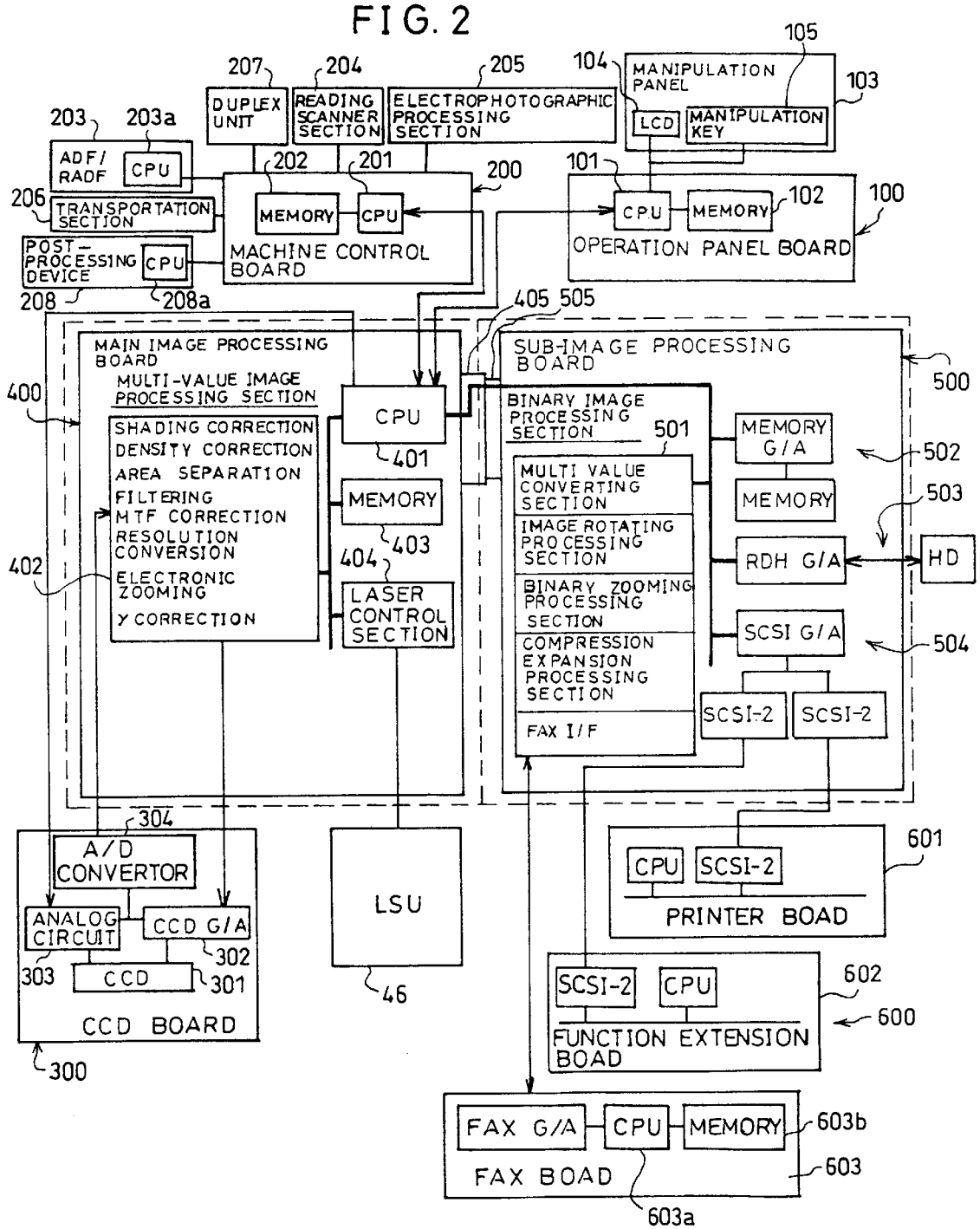
FIG. 2 is a block diagram illustrating a circuit structure of an image processing section and an entire structure of a control section of the digital copying machine.

FIG. 2 is a block diagram showing the entire arrangement of various unit sections and the image processing section that constitute the digital copying machine 30 of FIG. 1. FIG. 2 also shows that a main-central processing unit (hereinafter referred to as a CPU) 401, around the center of FIG. 2, and sub-central processing units are connected to each other and control the operation of the digital copying machine 30. The sub-central processing unit (hereinafter referred to as a CPU; to be described later) is provided for each unit section.

As shown in the block diagram, the circuit of the digital copying machine 30 is mainly composed of an operation panel board 100, a machine control board 200, a CCD board 300, a main-image processing board 400, a sub-image processing board 500, and an extension (expansion) board group 600 (a printer board 601, a function extension (expansion) board 602, a facsimile board (fax board) 603). The operation panel board 100, around the upper right of FIG. 2, manages and controls the manipulation panel 103. The machine control board 200, around the upper left of FIG. 2, manages and controls the respective units constituting the digital copying machine 30. The CCD board 300, around the lower left of FIG. 2, includes a CCD 301 (44) for electrically reading the document image to produce digital image data. The main-image processing board 400, around the center of FIG. 2, performs predetermined image processing with respect to the document image in the form of digital data (electronic data) produced by the CCD board 300. The sub-image processing board 500, around the lower right of FIG. 2, further performs predetermined image processing on the image data processed in the main-image processing board 400. The extension board group 600 is connected to the sub-image processing board 500 through interfaces.

Here, the expression "CCD 301 (44)" indicates that the CCD 301 of FIG. 2 corresponds to the CCD 44 of FIG. 1. Numerals in parentheses in the description below are also provided to express such a relationship.

The following description explains how each board is controlled.

(Operation Panel Board)

The operation panel board 100 is basically controlled by the sub CPU 101. Specifically, the sub CPU 101 manages a display screen of an LCD (liquid crystal display) (setting means) 104 disposed on an manipulation panel 103 and an operation inputted through a manipulation key group (manipulation keys) (setting means) 105 for inputting instructions relating to various modes. The setting means may be arranged to detect the processing mode of each image data according to the control information (protocol code) attached to the transmitted or transferred image data.

The operation panel board 100 is further provided with a memory 102 for storing data inputted through the manipulation keys 105 and various control information relating to the manipulation panel 103, for example, information to be displayed on the LCD screen.

In this arrangement, the sub CPU (control means) 101 communicates control information with the main CPU 401 and gives operational instructions to the digital copying machine 30.

The main CPU 401 transfers control signals indicating the operation state of the digital copying machine 30 to the sub CPU 101, thereby showing the operator the current operation state of the device through the LCD 104 of the manipulation panel 103.

(Machine Control Board)

The machine control board 200 is entirely controlled by a sub CPU (control means) 201. The sub CPU 201 controls an automatic document feeder 203 (36;

hereinafter referred to as an ADF), a reading scanner section 204 (31) for reading a document image, an electrophotographic processing section 205 (47) for reproducing an original image according to image data, a transportation section 206 (33), a duplex unit 207 (53) and a post-processing device 208 (34). A recirculating automatic document feeder (RADF) may be used as the ADF 203 (36). The transportation section 206 (33) sequentially transports a sheet on which an image is to be formed from a storage section to the electrophotographic processing section 205 (47). The duplex unit 207 (53) turns upside down a sheet on which an image has been recorded, and transports the sheet to form images on both sides of the sheet. The post-processing device 208 (34) performs post-processing such as stapling with respect to the sheets having images recorded thereon.

(CCD Board)

The CCD board 300 includes a CCD 301 (44) for electrically reading a document image, a circuit (CCD gate array) 302 for driving the CCD 301 (44), an analog circuit 303 for performing adjustment of the gain of analog data to be outputted from the CCD 301 (44), and an A/D converter 304 for converting an analog output from the CCD 301 (44) to a digital signal and outputting the digital signal as digital data (image data). The CCD board 300 is controlled and managed by the main CPU 401.

(Main-Image Processing Board)

The main-image processing board 400 which is controlled by the main CPU 401 includes a multi-value image processing section 402, a memory 403, and a laser control section 404. The multi-value image processing section 402 performs various processes with respect to multi-value image data so as to express the gradation of the original image in a desired manner based on digital data of a document image sent from the CCD board 300. Specifically, the multi-value image processing section 402 performs shading correction, density correction, area separation, filtering, MTF correction, resolution conversion, electronic zooming (scaling process), and gamma ($\gamma$) correction. The memory 403 stores image data having been processed and various control information such as information for managing the sequence of the processes. The laser control section 404 controls transfer of data to the laser writing unit 46 so that an original image is reproduced according to processed image data.

(Sub-Image Processing Board)

The sub-image processing board 500 includes a binary image processing section 501, a memory section 502, a hard disk device 503, and a SCSI (small computer system interface) section 504. The memory section 502 is composed of a memory and a gate array which controls the memory, and provided for storing and managing binary image data resulting from image processing and control information of processes. The hard disk device 503 is composed of a hard disk and a gate array which controls the hard disk, and provided for storing and managing image data of a plurality of documents so that a plurality of copies are produced by reading out the document images from the hard disk for a desired number of times. The SCSI section 504 is composed of a SCSI, as an external interface, and a gate array which controls the SCSI. The above-mentioned binary image processing section 501, the memory section 502, the hard disk device 503, and the SCSI section 504 are connected to the main-image processing board 400 and controlled by the main CPU 401 on the main-image processing board 400.

In addition, the binary image processing section 501 includes a multi value converting section for converting multi-value image data into binary image data, an image rotating processing section for rotating an image, and binary zooming processing (scaling) section for scaling up and down binary image data, (compression expansion processing section). The binary image processing section 501 further includes a fax interface section for transmitting and receiving fax image data through communications means (lines).

(Extension Board)

The extension board group 600 is constituted by the printer board 601, the function extension board 602, the facsimile board 603, etc. The printer board 601 is provided for permitting data from, for example, a personal computer to be outputted from a printer section of the digital copying machine 30 in a printer mode. The function extension board 602 is provided for extending the editing functions of the digital copying machine, thereby making an effective use of the characteristics of the digital copying machine. The facsimile board 603 is provided for sending, to a receiver, document image data read through the scanner section of the digital copying machine, and for outputting, from the printer section of the digital copying machine, image data sent from a sender.

The following description will explain in detail image data processing and flow of image data when the digital copying machine as an image processing device carries out a copy mode, a fax mode, or a printer mode.

(Copy Mode)

Documents placed at a predetermined position on the ADF 36 (203) of the digital copying machine 30 are sequentially fed sheet by sheet onto the document platen 35 of the scanner unit 40 (204). Images on the documents are read in sequence by the scanner unit 40 (204) having the above arrangement and then transmitted as 8-bit digital data to the main-image processing board 400. The 8-bit digital data transmitted to the main-image processing board 400 undergoes predetermined processing in the multi-value image processing section 402 as 8-bit digital image data.

After receiving processes such as the gamma correction, the 8-bit digital image data is sent to the laser writing unit 46 through the laser control section 404. In this manner, the document image read in the scanner section 31 (204) is outputted from the laser recording section 32 as copied image data with a gradation.

(Electronic RDH Function in a Copy Mode)

As described above, documents placed at a predetermined position on the ADF 36 (203) of the digital copying machine 30 are sequentially fed sheet by sheet onto the document platen 35 of the scanner unit 40 (204). Images of the documents are read in sequence by the scanner unit 40 (204) with the above arrangement and then transmitted, as image data in the form of 8-bit digital data, to the main-image processing board 400. The 8-bit digital data transmitted to the main-image processing board 400 undergoes predetermined processes in the multi-value image processing section 402 as 8-bit electronic image data.

The 8-bit digital image data is then sent to the sub-image processing board 500 through a connector 405 of the main-image processing board 400 and a connector 505 of the sub-image processing board 500, subjected to processes such as the error diffusion, and converted into 2-bit digital image data in the multi value converting section of the binary image processing section 501.

Note that processes such as the error diffusion are performed when converting 8-bit digital image data into 2-bit digital image data so as to prevent a problem in image quality that may occur when multi-to-binary conversion is simply performed. Namely, processes such as the error diffusion are performed to reduce degradation of the image quality and save storage capacity for storing images.

The 2-bit digital image data produced by the above conversion is sent, as a block per image data corresponding to a piece of document, to the memory, i.e., the hard disk device 503, etc. and temporarily stored and managed.

When all the documents placed on the ADF 36 (203) of the digital copying machine 30 are read, the 2-bit digital image data temporarily stored in the hard disk device 503 is read out a specified number of times by the control of the gate array to produce the specified number of copies. The read-out 2-bit digital image data is again sent to the main-image processing board 400 through the connectors 405 and 505 connected thereto, subjected to processes such as the gamma correction, and transferred to the laser writing unit 46 through the laser control section 404.

In the above description, after all images on a group of documents have been read, images are read out a desired number of times to produce the desired number of copies. However, the digital copying machine 30 can be arranged so that a sequential output of images is started from the copy of the first document when a predetermined amount of images are read. In this manner, the document images read in the scanner section 31 (204) of the digital copying machine 30 are outputted as copied image data with gradations from the laser recording section 32.

(Printer Mode)

Image data sent from an external apparatus, such as a personal computer, connected to the digital copying machine 30 by a network is converted in the printer board 601 into image data corresponding to each page (hereinafter referred to as page image data), once transmitted to the sub-image processing board 500 through the SCSI section 504 as an interface, and then stored in the memory such as the hard disk device 503.

Note that when the image data converted into page image data in the printer board 601 is sent to the sub-image processing board 500, the page image data is temporarily stored in the hard disk device 503 without undergoing the binary image processing. Furthermore, when the page image data temporarily stored in the hard disk device 503 is read out, no binary image processing is performed with respect to the page image data.

The image data temporarily stored in the hard disk device 503 is read out so as to be arranged in page order, sent to the main-image processing board 400, subjected to the gamma correction, and then controlled by the laser control section 404 so that the image data is written to reproduce the original image in the laser writing unit 46.

In this case, when image data is sent from an external apparatus with control information (output conditions) added thereto, the control information is converted so as to meet the specifications of the image processing device. The converted control information is added to the image data, and then the image data is transferred to the laser writing unit 46. Here, the control information indicates the font, character size, sheet size, print direction, etc. of an image to be reproduced. Meanwhile, when no control information is added to the image data, standard output conditions, set to the device in advance, is added to the image data. Then, the image data is sent to the laser writing unit 46.

(Fax Mode)

In the fax mode, the digital copying machine 30 sends a document to a receiver and receives a document from a sender.

First, sending a document to a receiver is explained below. Documents to be sent to a receiver are set at a predetermined position of the ADF 36 (203) of the digital copying machine 30. The documents are sequentially fed sheet by sheet onto the document platen 35 of the scanner unit 40 (204), read in sequence by the scanner unit 40 (204) with the above-described arrangement, and then transmitted to the main-image processing board 400 as 8-bit digital data. The 8-bit digital data transmitted to the main-image processing board 400 undergoes predetermined processes in the multi-value image processing section 402 as 8-bit digital image data.

The 8-bit digital image data is then sent to the sub-image processing board 500 through the connector 405 of the main-image processing board 400 and the connector 505, subjected to processes, such as the error diffusion, and converted into 2-bit digital image data in the multi value converting section of the binary image processing section 501.

Note that processes such as the error diffusion are performed when converting 8-bit digital image data into 2-bit digital image data so as to prevent a problem in image quality that may occur when multi-to-binary conversion is simply performed. Namely, processes such as the error diffusion are performed in order to reduce degradation of the image quality.

The image data of the documents to be sent is converted into a binary image in the above-mentioned manner, and then compressed in a predetermined manner, and stored in the memory section 502. When the digital copying machine 30 completes the procedure for sending documents to a receiver and becomes ready to send the documents, the image data of the documents to be sent, which have been read out from the memory section 502 and compressed in a predetermined manner, are transmitted to the facsimile board 603, subjected to necessary processes such as changing the compression manner in the facsimile board 603, and then sequentially sent to the receiver through a telecommunication line.

Next, explanations will be made of processing document image data sent from a sender.

When document image data is sent from a sender through a telecommunication line, the digital copying machine 30 receives the document image data having been sent from the sender while completing the communication procedure in the facsimile board 603. The received image data compressed in a predetermined manner is sent to the binary image processing section 501 of the sub-image processing board 500 through the fax interface section provided in the binary image processing section 501. Then, the document image data having been sent is reproduced as page image data in the compression expansion processing section, etc.

The document image data reproduced as the page image data is transmitted to the main-image processing board 400, subjected to the gamma correction, and controlled by the laser control section 404 so that the image data is written to reproduce the original image in the laser writing unit 46.

In this case, when document image data is received with control information (output conditions) added thereto, the control information is converted so as to meet the specifications of the image processing device. The converted control information is added to the document image data, and then the image data is outputted to the laser writing unit 46. Here, the control information indicates the font, character size, sheet size, print direction, etc. of an image to be reproduced. Meanwhile, when no control information is added to the image data, standard output conditions, set to the device in advance, is added to the document image data. Then, the document image data is sent to the laser writing unit 46.

As described above, the image processing section for performing a predetermined process with respect to image data is mainly composed of the main-image processing board 400 and the sub-image processing board 500. The main-image processing board 400 processes, as multi-value image data, document image data read and inputted through the scanner section 31 (204). The sub-image processing board 500 carries out a predetermined process such as a binary-coding process with respect to the document image data processed as the multi-value image data in the main-image processing board 400. The sub-image processing board 500 also performs a predetermined process on image data sent from an external apparatus connected with an interface, and then transfers the resulting image data to the multi-value image processing section (main-image processing board 400).

Furthermore, the main-image processing board 400 includes the laser control section 404 for controlling writing of the image data in the laser writing unit 46 so that the image is reproduced on the photoreceptor 48 of the electrophotographic processing section 47 by the laser writing unit 46.

With this structure, the document image data read and inputted through the scanner section 31 (204) can be reproduced as a copied image from the laser recording section 32 without impairing characteristics of the image of the document as multi-value image data. Additionally, for example, even when a large volume of documents are required to be processed and outputted at a high speed, the use of the sub-image processing board 500, the hard disk device 503, etc. enables reproduction of the document image data.

With this arrangement, it is possible to appropriately process the image data from external apparatuses such as a facsimile machine and a printer, and output the processed image. In particular, when receiving image data from a facsimile machine, the digital copying machine 30 can perform suitable processes according to digital functions as the characteristics of the digital copying machine 30 with respect to the image data, for example, a binary-coding process with respect to image data of a received document which has undergone multi-value image processing, i.e., retained the characteristics of the document image.

Moreover, since the image processing section is divided into parts, a variety of the digital copying machine 30 (a lineup of the finished product) can be supplied. It is thus possible to provide the user with a desired digital copying machine and easily develop the system of the digital copying machine as the user desires.

In addition, since the main CPU 401 disposed on the main-image processing board 400 manages and controls both the main-image processing board 400 and the sub-image processing board 500, the flow of the image data successively processed in the respective image processing sections is entirely managed. As a result, data and processes flow smoothly, thereby preventing the image data from being lost.

(Manipulation Panel)

Figure 3:
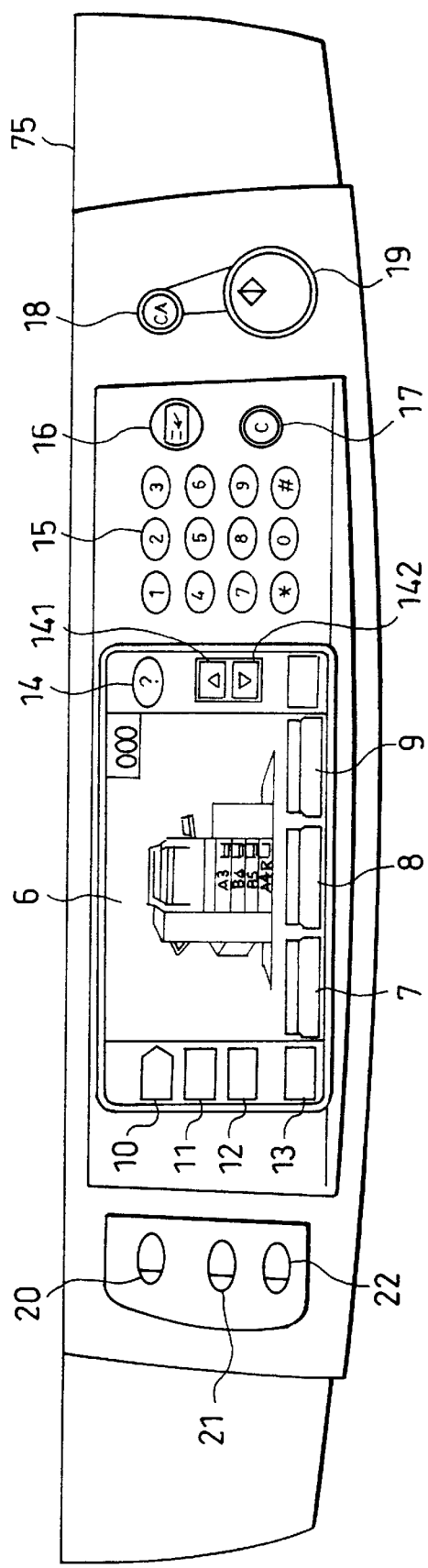
FIG. 3 is a plan view showing an example of a manipulation panel provided in the digital copying machine.

FIG. 3 shows a manipulation panel 75 (103) of the digital copying machine 30. A touch panel typed LCD 6 (104) is provided in the middle of the manipulation panel 75 (103), and a various-mode setting key group (setting means) is provided around the LCD 6 (104).

The touch panel typed LCD 6 (104) usually displays on its screen a basic start screen for selecting various modes. When an area for entering an instruction to select a desired mode is directly pressed with the operator's finger as the occasion arises, the display on the screen of the LCD 6 (104) successively changes so as to make it possible to input instructions of selecting various modes. When the operator touches, with his or her finger, the area where a desired editing function is displayed, the operator can set the editing function.

The following description briefly explains the various-mode setting key group provided on the manipulation panel 75 (103). An outline view of the digital copying machine is displayed around the center of the LCD 6 (104). Provided under the view are a copy-density setting key 7 for setting copy density, a sheet-size setting key 8 for setting a sheet size, and a scaling-factor setting key 9 for setting a scaling factor in scaling up and down image data.

In addition, a special function mode key 10, a duplex copy mode key 11, a key 12, and a setting confirmation key 13 are provided on the manipulation panel 75 (103). The special function mode key 10 changes the display on the LCD 6 (104) into an edit mode setting screen for editing a document image. The duplex copy mode key 11 changes the display on the LCD 6 (104) into a setting screen for moving into a duplex copy mode and setting a processing mode. The key 12 changes the display on the LCD 6 (104) into a screen for selecting an output mode such as a sorter mode and a staple mode. The setting confirmation key 13 is provided for confirming the contents of currently-set modes.

The manipulation panel 75 (103) further includes an manipulation guide key 14, scroll keys 141 and 142, a ten-key numerical pad 15, an interruption key 16, a clear key 17, an all cancellation key 18 and a start key 19. The manipulation guide key 14 is provided for displaying guidance information such as an manipulation method on the screen. The scroll keys 141 and 142 are provided for scrolling up and down the guidance information displayed on the LCD 6 so that the whole guidance information is displayed and confirmed. The ten-key numerical pad 15 is provided for inputting numerical information such as the number of copies. The interruption key 16 is provided for interrupting a currently-processing copy mode by a new copy mode and continuing the processing in the new mode. The clear key 17 is provided so that settings inputted through, for example, the ten-key numerical pad 15 are cleared. The all cancellation key 18 is provided so that the state of the digital copying machine is all cleared and reset to the normal state. The start key 19 is provided for making instructions of starting the processing in the mode set by the above keys. Here, the above-mentioned various keys of the manipulation panel 75 (103) are shown as manipulation keys 105 in FIG. 2.

The above-mentioned manipulation panel and various keys placed thereon are merely examples for explaining one embodiment of the present invention. Therefore, needless to say, the keys on the manipulation panel may vary depending on various functions built in the digital copying machine.

Figure 4:
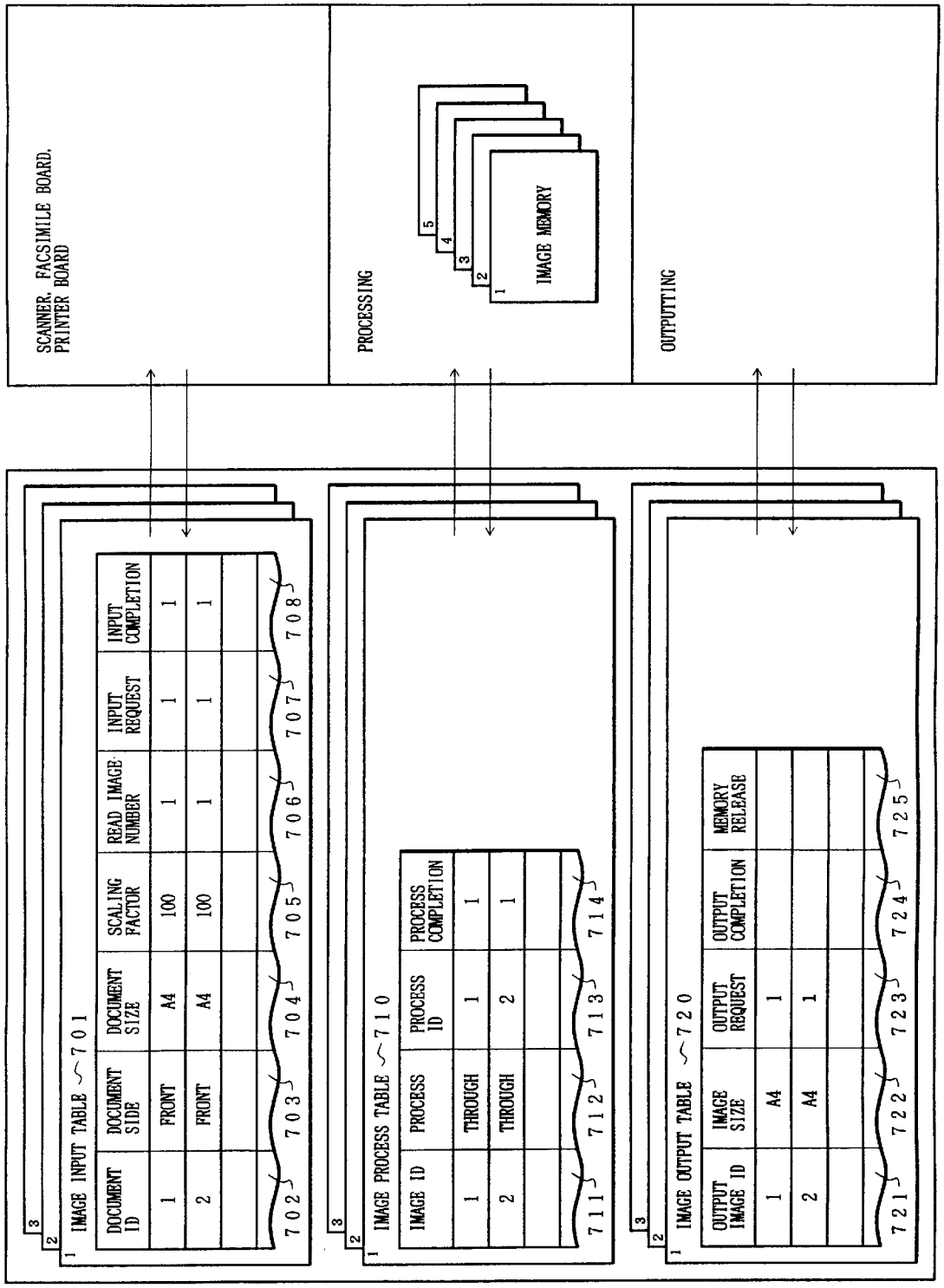
FIG. 4 is an explanatory view showing an example of a management table for managing information relating to inputted image data, image data to be processed, and images to be outputted, in the copying machine.

FIG. 4 shows a management table 700 for managing information relating to image data for each inputted image data. The management table 700 is constituted by three tables, i.e., an image input table 701, an image process table 710, and an image output table 720.

The management table 700 shows and manages control information (output conditions) added to inputted image data. The control information includes, for example, print information of the image data. The control information is arranged to be detected from the processed image data by, for example, the main CPU (confirmation means) 401. Here, the processed image data is obtained by performing image processing with respect to inputted image data according to the processing mode set for the image data. The control information, including print information, of the processed image data is converted to meet the specifications of the image processing device. Therefore, the control information of each image data is standardized in plurality of modes. Consequently, it is easy to detect the control information of the processed image data.

The three tables constituting the management table 700 to be explained in the present embodiment are produced in such a manner that each group of inputted image data has a table of one page, and that each image data constituting the group of the image data has a row in the table. Information relating to the characteristics (for example, output conditions) of each inputted image data and information relating to processing with respect to the image data are set and managed for each image data in the management table 700.

The following description will explain the three tables of the management table 700.

(Image Input Table)

The image input table 701 manages information relating to image data and information relating to a process, for each image data inputted through the scanner section 204 (31), the facsimile board 603, the printer board 601, etc.

With reference to FIG. 4, the following description will explain the image input table 701 in detail. In the image input table 701, there are, from the left to the right, columns for managing document ID information 702, document side information 703, document size information 704, scaling factor information 705, read image number information 706, input request information 707, and input completion information 708, respectively.

The document ID information 702 is an identification number for identifying each page of inputted document image data or received image data. The document side information 703 indicates whether the inputted image data corresponds to an image on the front side (surface) or the back side (surface) of the document.

The document size information 704 relates to the size of the inputted image data. The scaling factor information 705 is information relating to change in a scaling factor when scaling up and down the inputted image data.

The read image number information 706 indicates how many images are inputted as the image data of one page through an input section such as the scanner section 204 (31). The input request information 707 shows whether sections for processing the image data have been ready to perform predetermined processing with respect to the image data and given a request for transferring the image data. Here, the sections for processing the image data are, for example, the image processing section constituted by the main-image processing board 400 and the sub-image processing board 500, and an image recording section constituted by the laser writing unit 46, etc. The input completion information 708 shows whether image data of one page is completely inputted from the image input section (whether the image data is stored in the memory 403 and the memory section 502).

(Image Process Table)

The image process table 710 manages, for each image data, contents of image processing to be performed with respect to the image data and information relating to the image data which has undergone the image processing.

Referring to FIG. 4, the following description will explain in detail the image process table 710. In the image process table 710, there are, from the left to the right, columns for managing image ID information 711, process information 712, process ID information 713, and process completion information 714, respectively.

The image ID information 711 is an identification number for identifying each page of inputted image data. The process information 712 shows the contents of processing to be performed with respect to inputted image data for each page.

The process ID information 713 is information showing a location (an address, etc.) in the memory 403 and the memory section 502, where the inputted image data processed in accordance with the process information 712 and converted into output image data of one page is stored. The process completion information 714 shows whether the image processing instructed to be performed on the inputted image data is completed or not.

(Image Output Table)

The image output table 720 manages, for each page, information relating to an output of image data which has been processed.

With reference to FIG. 41 the following description will explain the image output table 720 in detail. In the image output table 720, there are, from the left to the right, columns for managing output image ID information 721, image size information 722, output request information 723, output completion information 724, and memory release information 725, respectively.

The output image ID information 721 is an identification number for identifying each page of the image data having been processed. The image size information 722 shows the size of the image.

The output request information 723 shows whether the image data is requested by the output section.

The output completion information 724 indicates whether the image data after receiving the image processing is outputted as instructed. The memory release information 725 shows that the output of the image data is completed and that the image data-stored memory is enabled to be released.

The respective management tables 701, 710 and 720 that constitute the management table 700 are explained in detail above. In accordance with the management table 700, the digital copying machine 30 performs predetermined processing on the image data inputted from the scanner section 31 (204) or extension functions such as the facsimile board 603 and the printer board 601, and stores the image data as final output image data in the memory 403 and the memory section 502.

Note that other items of information required for a processing system can be easily (freely) added to the various items of information managed in the above-mentioned management table 700. As described above, the management table 700 manages information relating to the image data for each inputted image data. The management table 700 is produced in the memory 403 such as a RAM (random access memory) controlled by the main CPU 401, by the main CPU 401 which manages the image processing section (ICU: image control unit) including the main-image processing board 400 and the sub-image processing board 500 of the digital copying machine 30.

However, needless to say, other arrangements are possible, considering the circuit arrangement in the image processing device, space for the device, and wiring, etc. Namely, it is possible to produce the management table 700, for example, on the machine control board 200, or outside the main body of the device, like external memory devices including various memory cards or external servers and controllers connected to the device by a network.

Referring now to FIG. 4, the following description will explain how the management table 700 manages management information, by taking as an example the case where two documents in A4-size are placed on the ADF 203 (36).

When two documents in A4-size are set on a document tray (handler) of the ADF 203 (36), the image input table 701 for managing an input of image data manages various items of information described below.

Since the number of the documents is not recognized at this time, only "1" is shown as the document ID information 702. The document size is set to "A4", which has been confirmed by document size detecting means. The scaling factor is set to "100%" according to the setting entered through the scaling-factor setting key 9 on the manipulation panel 103 (75). Since the document image data which has been read is stored in, for example, the memory 403 and the memory section 502, the information, for example, "1" confirmed is managed as the number of document image read.

When a request to input the document image is given, the input request information 707 in the image input table 701 is set to "1". Then, the input of the document image is started by scanning the first document with the scanner unit 40 (204). When the presence of the second document is confirmed, the management table for managing the image data of the second document is produced, and "2" is set as the document ID information 702 corresponding to the second document.

As shown in FIG. 4, information relating to each image data of the two documents inputted through the scanner section 31 (204) is managed in the image input table 701. When the image data of the two documents are completely inputted, "1" indicating that the document image data is inputted is set as the input completion information 708 for each document image data. Thus, it is confirmed that all of the document images are inputted.

Meanwhile, in the image processing section, the image process table 710 for managing the information relating to the processing with respect to the document image data is produced. In the image process table 710, information relating to the image processing for each inputted image data is managed.

Since no editorial instruction to perform special image processing is inputted through the manipulation panel 75 (103), the process information 712 is set "through" for each document image data.

Namely, the document image data read and inputted through the scanner section 31 (204) is subjected to normal multi-value image processing, and the resulting multi-value image data is simply outputted as a copied image of the document from the laser recording section 32.

When the normal image processing (multi-value image processing) is performed with respect to the inputted document image data and the image-processed image data is prepared in the memory 403 and the memory section 502, the process ID information 713, as information showing a location (address) where the image data is stored in the memory 403 and the memory section 502, is set to "1", and the process completion information 714 is set to "1" indicating completion of the processing.

When the normal image processing (multi-value image processing) is completed with respect to the inputted image data of the two documents, information showing the locations (addresses) where the image data of the first and second documents are stored and managed in the memory 403 and the memory section 502 are set to "1" and "2", respectively, as the process ID information 713. The process completion information 714 is set to "1" for each image data.

It is thus confirmed that the instructed image processing has been performed with respect to each inputted image data, and the location where each image data is stored in the memory 403 and the memory section 502 is confirmed. Next, the image output table 720 is produced so as to manage the processed image data as image data which can be finally reproduced and outputted from the laser recording section 32.

A management table for each page image data to be outputted is produced in the image output table 720 in order to manage, as image data that can be outputted from the laser recording section 32, the image data processed according to the image process information managed in the image process table 710, in the memory 403 and the memory section 502.

Next, when the preparation for the output is completed and an output request signal from the image output section is confirmed, the signal "1" indicating that the output request has been received is set as the output request information 723. Then, the image data is successively outputted.

When t he output of the image data is completed, the memory release information 725 for releasing the memory 403 and the memory section 502, i.e., enabling an instruction to clear the image data form the memory 403 and the memory section 502, is set.

In the copy mode, the document image data read and inputted through the scanner section 31 (204) is managed as final output image data in the memory 403 and the memory section 502 through the above-mentioned processes. According to the same processes, input image data which is inputted through the facsimile board 603 or the printer board 601 is subjected to predetermined processing in the respective modes and stored as final output image data in the memory 403 and the memory section 502.

How the digital copying machine 30 carries out the image processing with respect to inputted image data and the management of the images is explained so far. It is further necessary to manage, as one job, a group of inputted image data in each input mode. Therefore, the digital copying machine 30 is provided with a register job management table 730 for managing jobs as shown in FIG. 5.

In the register job management table 730, there are, from the left to the right, columns for managing register ID information 731, mode information 732, job status information 733, restarting instruction information 734, and priority information 735. The register ID information 731 identifies each group of inputted image data. The mode information 732 indicates in which mode the image data is inputted. The job status information 733 indicates the current status of the job. The restarting instruction information 734 indicates whether a specific instruction from the manipulation panel 75 (103) is required or not so as to execute the job. The priority information 735 indicates the order of priority in order to process the job with higher priority first. According to the various information managed in this table and the status of the digital copying machine 30, inputted image data is efficiently processed.

The register ID information 731 managed in the register job management table 730 corresponds to the output image ID information 721 managed in the image output management table 720 of the management table 700 shown in FIG. 4.

The register job management table 730 of FIG. 5 shows that the digital copying machine 30 has been instructed to process five jobs. Specifically, in the digital copying machine 30, an interrupt copy is now in progress while another copying process is temporarily suspended, and two images from a facsimile machine and one image from a printer are waiting for being outputted.

The digital copying machine 30 is arranged so as to output the inputted image data in the order of the copy mode, the printer mode, and the facsimile mode. Note that this order of priority in the output process can be freely set as the user (owner) desires.

The register job management table 730 produced when image data is inputted in various modes is explained as above. Next, the following description explains a new output management table for managing information relating to the output of an image for each image data, which is produced when the inputted image data is being outputted.

When the image is being outputted, a print management table 740 and a sheet management table 760 are produced. These management tables are managed by the CPUs on the control boards for controlling the image output section, for example, the sub CPU 201 on the machine control board 200.

First, as shown in FIG. 6, the print management table 740 is produced for each job managed by the register job management table 730. The print management table 740 manages various information such as an image output conditions of each image data to be printed and outputted.

The following description will explain the print management table 740 in detail. In the print management table 740, there are, from the left to the right, columns for managing print ID information 741, sheet size information 742, tray location information 743, and attribute data. The column for managing the attribute data is further divided into six columns for managing information 744 to 749, respectively. The print ID information 741 identifies each image to be printed (outputted). The sheet size information 742 indicates a sheet size suitable for recording the image. The tray location information 743 indicates the location of a tray which stores the sheets of the suitable size in accordance with the sheet size information 742, in the digital copying machine 30. The information 744 indicates whether the image is to be recorded on the front side or the back side of the sheet. The information 745 indicates whether the image is printed on the sheet or a blank sheet is outputted. The information 746 indicates that the image is to be printed in normal modes or printed in other modes such as a composite sheet mode and a cover sheet mode. The information 747 indicates whether the image is to be outputted last. The information 748 indicates whether the next print side is to be changed. The information 749 indicates whether the job is instructed to be temporarily suspended or not. Various control information as described above are managed when the image is being recorded.

In the extreme right of the print management 3 table 740, there is a column for managing the pointer information 750 indicating the progress of the outputting of the image data. As shown in the register job management table 730 of FIG. 5, the copy mode, i.e., "job 1" is temporarily suspended by an interrupt copy, i.e., "job 4". The arrow "1" as the pointer information 750 in FIG. 6 shows from which image data the copy mode, i.e., "job 1" should be restarted.

In addition, it is confirmed from various information managed in the print management table 740 that sheets in A4-size are stored in the feed tray 51 in the second location as a cassette feeder, and sheets in A3-size are stored in the feed tray 51 in the fourth location of the multi-stage feed section in the digital copying machine 30.

In the explanation above, the print management table 740 is produced every time a group of image data is inputted through the input means. However, the following arrangement is also possible. Namely, when a group of image data is inputted as a job, the register job management table 730 is produced to manage the job. Then, the print management table 740 is produced when the job is processed, thereby outputting the image data stored and managed in the memory 403 and the memory section 502.

Figures 7A, 7B:
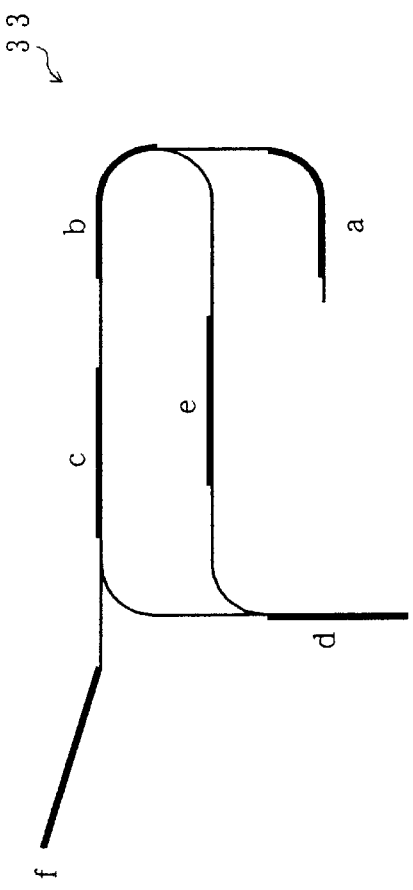
FIG. 7(A) is an explanatory view showing a sheet management table for managing sheets on which images are formed in accordance with the print management table in the copying machine.
FIG. 7(B) is an explanatory view showing locations of sheets in a transportation section, managed in the sheet management table.

Next, as shown in FIG. 7(A), the sheet management table 760 is produced. The sheet management table 760 manages information of each sheet transported for the image printing according to the print management table 740. In accordance with the information managed in this table, sheets are fed, transported, and subjected to post-processing.

The following description will explain the sheet management table 760 in detail. In the sheet management table 760, there are, from the left to the right, columns for managing sheet ID information 761, sheet size information 762, tray location information 763, job information 764, print ID information 765, sheet location information 766, sheet interval time information 767, and sheet processing command information 768. The sheet ID information 761 identifies each sheet being transported. The sheet size information 762 indicates the size of the sheet. The tray location information 763 indicates from which tray the sheet has been fed. The job information 764 indicates for which print job the sheet has been transported. The print ID information 765 indicates to which image data in the memory 403 and the memory section 502 the image printed on the sheet corresponds. The sheet location information 766 indicates the location of the sheet in the transportation section 33. The sheet interval time information 767 indicates the interval between the sheet and the previously-transported sheet. The sheet processing command information 768 indicates how the sheet is transported and subjected to post-processing.

What is confirmed from various information is as follows. "Sheet 1" is in A4-size and fed from the feed tray 51 in the second location (stage) of the multi-stage feed section. The "Sheet 1" on which the image "1" of the "job 1" has been formed is now at a position "f", i.e., at a discharging section, and being transported toward the post-processing device (finisher) 34 (208) at a speed corresponding to the sheet interval time of 17*50 msec.

In addition, "Sheet 4" is in A4-size and fed from the feed tray 51 in the second location. The "Sheet 4" on which the image "4" of the "job 1" has been formed is now at a position "a", i.e., at a feeding section, and being transported toward the post-processing device 34 (208) at a speed corresponding to the sheet interval time of 17*50 msec.

It is further confirmed that after the "Sheet 4" is transported to the post-processing device 34 (208), four pieces of sheets, i.e., the "Sheet 1" to "Sheet 4" undergo stapling.

Here, the sheet transport speed (sheet interval time) is adjustable in a unit of 1 block per 50 msec in the transportation section 33. The sheet interval time of 17*50 msec in the copy mode means that the sheet is controlled to be transported at a speed of 17 block per 50 msec. The sheet interval time varies depending on the processing mode such as the printer mode and the facsimile mode.

As shown in FIG. 7(B), the sheet location information 766 managed in the table for each sheet indicates the predetermined positions in the transportation section 33. Namely, the symbols a, b, c, d, e, and f in FIG. 7(B) represent a feeding section, a resist-roller section (standby section), a separation section, an inversion section, a loop section (duplex recording), and the discharging section, respectively. These transport positions are arranged to be detected by a sheet detecting sensor (not shown) disposed in the transportation section 33. Note that the information for sheet management can be divided into more items of information according to the desired control level.

Next, the following description will explain how the output process of the image data and the transport of the sheet are managed by using management tables in duplex recording.

Figure 8:
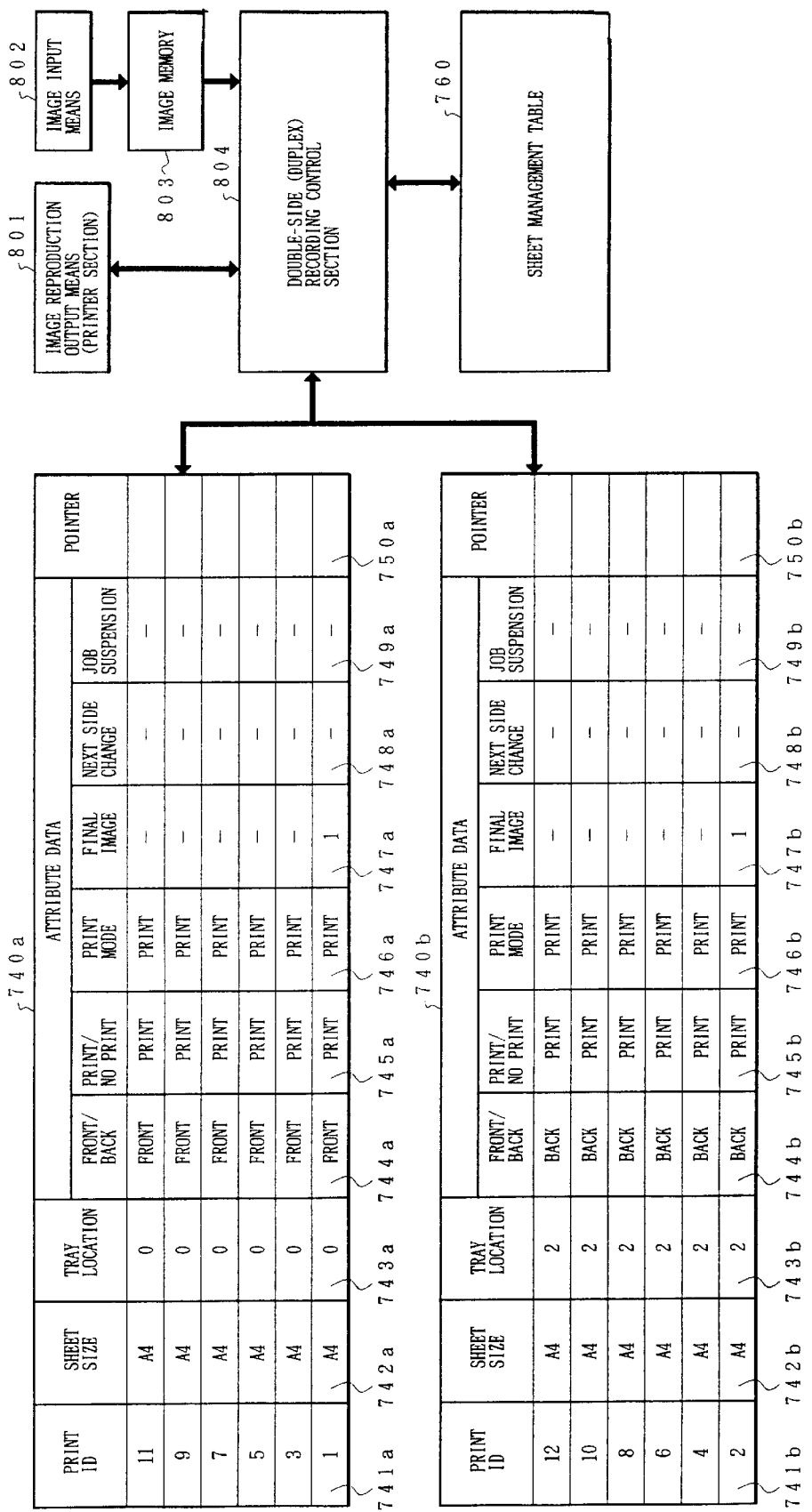
FIG. 8 is an explanatory view showing connections between print management tables, between blocks for performing control and management, and between the print management tables and the block diagram in a duplex image recording mode in the copying machine.

FIG. 8 shows the print management table 740 (740*a*, 740*b*) for storing and managing the image data of each image, inputted through image input means 802, in the image memory 803 (403, 502) so as to record and reproduce the image data on both sides of the sheet. The print management table 740 is divided into a print management table 740*a* for managing the image to be printed on the front side of the sheet, and a print management table 740*b* for managing the image to be printed on the back side of the sheet.

The two print management tables 740*a* and 740*b* are independently managed by a duplex recording control section 804 (53, 207 or the machine control board 200). While sequentially confirming print conditions according to a predetermined sequence, image reproduction output means 801 (printer section) as the laser recording section 32 performs duplex recording.

In this case, the sheet management table 760 is created so as to manage information on how each sheet is being transported in the image reproduction output means 801 (printer section) as the laser recording section 32, and how the sheet should be transported.

The print management table 740*a* shown in FIG. 8 is produced so as to manage information relating to the image to be printed on the front side of the sheet. "0" set as tray location information 743*a* indicates that the image is to be printed on the respective sheets fed from the duplex unit 53 (207).

The print management table 740*b* is created so as to manage information relating to the image to be printed on the back side of the sheet. As shown in FIG. 8, the print management table 740*b* indicates that sheets in A4-size are fed from the feed tray 51 in the second location (stage) of the multi-stage feed section, for forming the images on the respective sheets.

Image recording is then started in the following manner. First, the double-side (duplex) recording control section 804 feeds, from the feed tray 51 in the second location, a predetermined number of new sheets in A4-size for duplex recording. In this case, a maximum number of sheets within the capacity of the transportation section 33 are fed and transported for forming the image on the back side thereof. When the transportation section 33 is filled with the sheets, another predetermined number of sheets having been turned upside down (inverted) are successively fed from the duplex unit 53 (207) to the image recording section where images are formed on the front side of the respective sheets.

This transport of the predetermined number of sheets makes a space in the transportation section 33, and then the same number of new sheets in A4-size are fed and transported for forming the image on the back side of the sheets. As described above, the transport of the sheets is performed alternately from the multi-stage feed section and from the duplex unit 53 (207) in a switching manner. Finally, the images are recorded on the front side of all of the sheets having been inverted and transported from the duplex unit 53 (207).

The following description will explain how the sheet management table 760 manages the information of each sheet and how the sheets are transported through the transportation section 33.

In order to carry out the duplex (both-side) recording, sheets are transported through a duplex transport loop in the following manner. First, four pieces of sheets in A4-size are successively fed from the feed tray 51 in the second location. Then, feeding sheets from the feed tray 51 in the second location is temporarily stopped. The four pieces of fed sheets sequentially receive the respective images on the back side thereof.

Next, when the first sheet having been inverted reaches the resist-roller section, the first and second sheets, which have been inverted, are successively fed from the duplex transport loop to the image recording section so as to sequentially form the respective images of the front side thereof.

The transport of the two sheets makes a space in the duplex transport loop, which is available for transporting other two sheets in A4-size. Therefore, from the feed tray 51 in the second location, two sheets are successively fed so as to form the respective images on the back side thereof.

After the two sheets are fed from the feed tray 51 in the multi-stage feed section, switching is performed and the sheet is fed from the duplex transport loop.

At this time, if the transport of new sheet in A4-size for recording an image is not required any more, the four sheets are inverted and successively fed from the duplex transport loop, and the respective images are recorded on the front side of the inverted sheets. It is thus possible to minimize stagnation of the sheets in the duplex transport loop, thereby efficiently recording images on both sides of the sheets.

In the explanation above, after four pieces of sheets in A4-size are successively fed, two pieces of sheets are alternately fed from the feed tray 51 of the multi-stage feed section and from the duplex transport loop. The number of sheets controlled to be transported varies depending on the arrangement of the device, such as the transport path length of the duplex transport loop and the transport speed of the sheets, and is adjustable so that the device can perform the most efficient transport control.

How the sheets are transported in the above explanation is clear from FIGS. 9(A) to 9(D). The sheet management table 760*a* shown as an example of the sheet management table 760 in FIG. 9(A), manages information of each sheet when four sheets in A4-size are successively fed from the feed tray 51 in the second location. The transport states of these sheets in the duplex transport loop are shown in FIG. 9(B).

What is confirmed from the management information of each sheet managed by the sheet management table 760*a* is as follows. Namely, the four sheets are in A4-size and fed from the feed tray 51 in the second location (stage). The print ID information 765*a* shows that the images identified as "12", "10", "8", "6" are printed on the respective sheets. Here, the print ID information 765*a* corresponds to the print ID information 741*b* managed in the print management table 740*b* of FIG. 8.

Further, the sheet processing command information 768*a*, set to "duplex", so as to control all of the four sheets to be transported toward the duplex transport loop.

Next, the sheet management table 760*b* of FIG. 9(C) shows that two pieces of sheets having been inverted are fed from the duplex transport loop, and that two pieces of new sheets are fed from the feed tray 51 (see FIG. 9(D)).

What is confirmed from the management information of each sheet managed in the sheet management table 760*b* is as follows. Hereinafter, the sheets identified as "1" to "6" by the sheet ID information are referred to as first to sixth sheets, respectively. The first to third sheets have been inverted and fed from the duplex transport loop. The print ID information 765*b* of the three sheets shows that the images are formed on the front side of the respective sheets. In addition, the sheet processing command information 768*b* of the three sheets is now changed to "finisher".

Furthermore, since the fourth sheet has the image recorded on the back side thereof, "6" is set as the print ID information 765*b*, thereby showing the corresponding image is to be printed on its front side. The sheet processing command information 768*b* is still set to "duplex", which indicates that the fourth sheet has not been inverted and fed from the duplex transport loop.

Moreover, the two sheets newly fed from the feed tray 51 are managed as fifth and sixth sheets, respectively, by the sheet ID information 761*b*. The sheet processing command information 768*b* of the two sheets is still set to "duplex", and the print ID information 765*b* of the fifth and sixth sheets are set to "4" and "2", respectively, so that the images corresponding to "4" and "2" are formed on the back side of the respective sheets.

The sheet management table 760*c* of FIG. 10(A) indicates that the image formation of the first and second sheets has been completed (see FIG. 10(B)). The management tables for managing information of the first and second sheets are reset (the lines for managing information of the first and second sheets are erased), and the remaining four sheets are managed as the third to sixth sheets, respectively.

The third and fourth sheets are now being transported from the duplex transport loop to the image forming section so as to form the images on the front side of the respective sheets. The fifth and sixth sheets are to be inverted and transported to the duplex transfer loop after images are formed on the back side of the respective sheets.

The sheet management table 760*d* of FIG. 10(C) indicates that the third and fourth sheets are being transported from the duplex transport loop to the image forming section where the images are formed on the front side of the respective sheets. In addition, the fifth and sixth sheets have been transported from the feed tray 51 to the duplex transport loop (see FIG. 10(D)).

The sheet management table 760*e* of FIG. 11(A) indicates that the image formation on both sides of the third and fourth sheets is completed. The tables for managing information of the third and fourth sheets are reset (the lines for managing the third and fourth sheets are erased), and the remaining two sheets are managed as the fifth and sixth sheets, respectively.

The sheet management table 760*e* also indicates that the fifth and sixth sheets are being fed from the duplex transport loop to the image forming section where the images are formed on the front side of the respective sheets (see FIG. 11 (B)).

Finally, the sheet management table 760*f* of FIG. 11(C) indicates that the image formation on the first to sixth sheets is all completed. The six pieces of sheets discharged to the post-processing device (finisher) 34 (208) are to be subjected to stapling in accordance with the sheet processing command information 768*e* (see FIG. 11(D)).

When the stapling of the six sheets is completed, the line for managing information of the sixth sheet is erased from the sheet management table 760.

By performing management and control in the above-described manner, six copied materials in A4-size with images formed on both sides are obtained.

The following description will explain another example of the management table structure, which achieves further improved reliability.

When the printmanagement table 740 of FIG. 6 is created, a feed tray 51 which stores the sheets of the appropriate size is determined from the multi-stage feed section of the digital copying machine 30 in accordance with the sheet size information 742 of the image data to be outputted, and the tray location information 743 indicating the location of the determined tray is set in the print management table 740.

The feeding of the sheets in accordance with the tray location information 743 is controlled to be carried out after it is reconfirmed that the sheets in the determined tray have the appropriate size.

By programming the digital copying machine 30 as described above, it is possible to certainly feed the sheets of the suitable size to the image forming section even when sheets of a different size are placed in the determined tray after the print management table 740 is once created.

If it is detected that the sheets placed in the determined tray have a different size, the tray which stores the sheets with the appropriate size is selected from the feed trays 51 of the multi-stage feed section in accordance with the sheet size information 742 of the image data to be outputted. Furthermore, the tray location information 743 managed in the print management table 740 is changed so that the feeding of the sheets thereafter is smoothly performed.

As described so far, an image processing device of the present invention includes: (1) input means for inputting image data; (2) setting means for setting a processing mode of inputted image data; (3) image processing means for performing predetermined image processing in accordance with the processing mode set by the setting means; (4) output means for outputting the image data that has undergone the image processing; (5) management means for managing output conditions of each image data to be outputted by the output means; and (6) control means for controlling each image to be outputted by the output means in accordance with the output conditions of the image data managed by the management means.

With this arrangement, since the image processing device is provided with the image processing means and the setting means, it is possible to standardize the control information of the image data, inputted in accordance with each processing mode, so as to meet the specifications of the output process, such as the print process, performed by the output means. Consequently, the above arrangement can simplify the output process of the image data in the respective processing modes.

The image processing device is further provided with the management means for managing output conditions of each image data, and the processed image is outputted through the output means in accordance with the output conditions managed by the management means. It is thus possible to certainly manage the output process of each inputted image data. Furthermore, since the output conditions are managed by the management means, recovery from a trouble is easily carried out, thereby improving reliability in the output process.

The image processing device may be arranged to further include group management means for managing information relating to each group of image data inputted through the input means so that a group of image data to be outputted is determined in accordance with the information managed by the group management means, and that each image data of the determined group is outputted in accordance with the output conditions of the image data managed by the management means.

With this arrangement, the following effects are produced. Namely, since the group management means is provided for managing information of each group (job) of inputted image data, a group of image data to be outputted is determined in accordance with the information managed by the group management means, and each image data of the determined group is outputted in accordance with the output conditions of the image data managed by the management means. As a result, even if the device is provided with a plurality of input means like a multi-functioned digital copying machine, it is possible to certainly manage each group of image data inputted through each input means, and surely manage and control the output process of each image.

In addition, since management information is determined according to the latest state of the device in outputting the image data, information, such as location information of a tray from which the sheet is fed, which may often be varied, can be updated in accordance with the variation and determined appropriately.

The image processing device is preferably arranged so that information managed by the group management means includes priority information for outputting groups of image data in order of priority.

With this arrangement, the following effects are achieved. Namely, the group management means manages each group of inputted image data, thereby outputting the groups of image data in order of priority in accordance with the management information managed by the management means. As a result, even if the device is provided with a plurality of input means like a multi-functioned digital copying machine, it is possible to certainly manage the group of image data inputted through each inputted means, and surely manage and control so that each group of image data is outputted in order of priority.

The image processing device is preferably arranged so that information managed by the management means includes information of recording medium storage means for storing a recording medium of a size suitable for each image to be outputted by the output means.

With this arrangement, since information managed by the management means includes information relating to the recording medium storage means where the recording medium of a size suitable for the image to be outputted is stored, the information relating to the recording medium storage means can be set as the control information, required for controlling the transport of the recording medium, before feeding the recording medium.

Furthermore, when a suitable recording medium is not present in outputting the image data, it is also possible to surely inform the user that the outputting of the image data cannot be properly performed.

The image processing device is preferably arranged so that, when the image is outputted in accordance with the output conditions of the image data managed by the management means, the control means feeds the recording medium after confirming whether the recording medium of a size suitable for the image is stored in the recording medium storage means.

With this arrangement, since the recording medium storage means is reconfirmed when the image is outputted, it is possible to certainly transport the recording medium of the suitable size to the output means, even in the case where the location or the size of the recording medium is changed after the management table showing the output conditions of each image data has been created.

The image processing device is preferably arranged so that, when the recording medium of the size suitable for the image is not stored in the recording medium storage means, the control means checks other recording medium storage means and determines the recording medium storage means where the recording medium of the suitable size is stored.

With this arrangement, the following effects are produced. Namely, when the recording medium storage means is reconfirmed in outputting the image data, if the recording medium has a different size, the management information is changed so as to indicate the recording medium storage means storing the recording medium of the suitable size. It is thus possible to surely transport the recording medium of the suitable size to the output means, even in the case where the location or the size of the recording medium is changed after the management table showing the output conditions of each image data has been created.

In addition, since the management information is altered when a change of the recording medium storage means is confirmed, feeding of the recording medium thereafter can be smoothly and accurately controlled.

The image processing device is preferably arranged to be further provided with information management means for managing information relating to a recording medium on which an image is to be recorded, so that information managed by the information management means includes information relating to a transport destination for controlling a transport of the recording medium.

With this arrangement, the following effects are produced. Namely, the information management means is provided for managing information relating to each recording medium on which the image is recorded in accordance with the output conditions managed by the management means, and information managed by the information management means includes information for controlling the transport destination of the recording medium in the device. It is thus possible to control each recording medium to be surely transported toward the destination, even when a great amount of recording media are transported at a high speed in the transport section.

The image processing device is preferably arranged to be further provided with information management means for managing information relating to a recording medium on which an image is recorded, so that information managed by the information management means includes control information for controlling post-processing performed with respect to the recording medium.

With this arrangement, the following effects are produced. Namely, the information management means is provided for managing information relating to each recording medium on which the image is recorded in accordance with the output conditions managed by the management means, and information managed by the information management means includes control information for controlling the post-processing performed with respect to the recording medium. It is thus possible to certainly carry out the post-processing such as the stapling and finisher with respect to the recording medium on which the image is recorded, and to surely obtain a desired copied material.

The image processing device of the present invention may be arranged so that, when the image data is outputted onto a front side and a back side of a recording medium, the management means is divided into a first management section for managing the output conditions of the image data to be outputted onto the front side of the recording medium and a second management section for managing the output conditions of the image data to be outputted onto the back side of the recording medium.

With this structure, when the image data is outputted onto a front side and a back side of a recording medium, the management means manages the image data separately by the first management section for managing the output conditions of the image data to be outputted onto the front side of the recording medium and by the second management section for managing the output conditions of the image data to be outputted on the back side of the recording medium. It is thus possible to smoothly control the transport of the recording medium for duplex (both-side) recording, and to easily perform control after the output process of the image is temporarily suspended until it is restarted, thereby improving the reliability of the device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing device comprising:

input means for inputting image data;

setting means for setting a processing mode of inputted image data;

image processing means for performing predetermined image processing in accordance with the processing mode set by said setting means;

output means for outputting, as an image, image data that has undergone the image processing performed by said image processing means;

management means for storing various items of information for managing a series of processing, which performs the predetermined image processing on the image data inputted via said input means by means of said image processing means, which determines the processed image data as a final image data to be outputted on a memory, and which outputs the image data via said output means; and control means for preparing said management means for each of the inputted image data, and for storing the various items of information in said management means for each image data in accordance with progress of the series of processing.

2. The image processing device as set forth in claim 1, further comprising group management means for managing information relating to each group of image data inputted through said input means, wherein a group of image data to be outputted is determined in accordance with the information managed by said group management means, and each image data of the determined group is outputted in accordance with the output conditions of the image data managed by said management means.

3. The image processing device as set forth in claim 2, wherein information managed by said group management means includes priority information for outputting groups of image data in order of priority.

4. The image processing device as set forth in claim 1, further comprising recording medium storage means, wherein information managed by said management means includes information of said recording medium storage means for storing a recording medium of a size suitable for each image to be outputted by said output means.

5. The image processing device as set forth in claim 4, wherein, when the image is outputted in accordance with the output conditions of the image data managed by said management means, said control means is arranged to feed the recording medium after confirming whether the recording medium of a size suitable for the image is stored in said recording medium storage means.

6. The image processing device as set forth in claim 5, wherein, when the recording medium of the size suitable for the image is not stored in said recording medium storage means, said control means is arranged to check other recording medium storage means and determine the recording medium storage means where the recording medium of the suitable size is stored.

7. The image processing device as set forth in claim 1, further comprising information management means for managing information relating to recording medium on which an image is to be recorded, wherein information managed by said information management means includes information relating to a transport destination for controlling a transport of the recording medium.

8. The image processing device as set forth in claim 1, further comprising information management means for managing information relating to a recording medium on which an image is recorded, wherein information managed by said information management means includes control information for controlling post-processing performed with respect to the recording medium.

9. The image processing device as set forth in claim 1, wherein, when the image data is outputted onto a front side and a back side of a recording medium, said management means is divided into a first management section for managing the output conditions of the image data to be recorded on the front side of the recording medium and a second management section for managing the output conditions of the image data to be recorded on the back side of the recording medium.

10. The image processing device as set forth in claim 9, wherein the recording medium is a sheet, and said output means includes a device for turning over the sheet so as to output an image on each side of the sheet in accordance with the image data.

11. The image processing device as set forth in claim 1, further comprising confirmation means for confirming characteristics of the image data which has undergone the image processing.

12. The image processing device as set forth in claim 10, wherein the characteristics is the output conditions of the image data.

13. The image processing device as set forth in claim 1, wherein said output means outputs the image data as an image on a recording medium by transporting the recording medium.

14. The image processing device as set forth in claim 1, wherein said output means outputs the image data as an image on each side of a recording sheet as a recording medium by transporting the recording sheet.

15. The image processing device as set forth in claim 1, further comprising a device for successively and automatically feeding a plurality of recording media in accordance with the image data.

16. The image processing device as set forth in claim 1, wherein said output means outputs an image on a sheet, and said output means includes a device for turning over the sheet so as to output an image on each side of the sheet in accordance with the image data.

17. The image processing device set forth in claim 1, wherein the processing mode is at least one mode selected from the group consisting of a print mode, a copy mode, and a fax mode.

18. The image processing device as set forth in claim 1, wherein the management means includes an image input table, which stores at least:

(a) identification information for identifying the inputted image data, and (b) representation information that is effective to represent whether the input of the image data is completed.

19. The image processing device as set forth in claim 1, wherein the management means includes an image process table, which stores at least:

(a) identification information for identifying the inputted image data, (b) process information for managing the contents of processing to be performed with respect to the inputted image data, (c) location information on the memory in which the processed image data is determined as a final image data to be outputted, and (d) representation information that is effective to represent whether the image processing instructed to be performed on the inputted image data is completed.

20. The image processing device set forth in claim 1, wherein the management means includes an image output table which stores at least:

(a) identification information for identifying the image data having been processed, and (b) representation information that is effective to represent whether the output of the image data is completed.

* * * * *